(12) United States Patent
Kameyama

(10) Patent No.: US 6,738,426 B2
(45) Date of Patent: May 18, 2004

(54) APPARATUS AND METHOD FOR DETECTING MOTION VECTOR IN WHICH DEGRADATION OF IMAGE QUALITY CAN BE PREVENTED

(75) Inventor: Hirokazu Kameyama, Tokyo (JP)

(73) Assignee: NEC Corporation, Tokyo (JP)

(*) Notice: Subject to any disclaimer, the term of this patent is extended or adjusted under 35 U.S.C. 154(b) by 706 days.

(21) Appl. No.: 09/731,003

(22) Filed: Dec. 6, 2000

(65) Prior Publication Data

US 2001/0003535 A1 Jun. 14, 2001

(30) Foreign Application Priority Data

Dec. 10, 1999 (JP) .............................. 11-351896

(51) Int. Cl.$^7$ .............................. H04N 7/12; H04N 9/64; G06K 9/36
(52) U.S. Cl. ................... 375/240.16; 382/236; 348/699
(58) Field of Search ................... 375/240.16, 240.24, 375/240.07; 348/402.1, 413.1, 416.1, 699, 620; 382/236

(56) References Cited

U.S. PATENT DOCUMENTS

| | | | | |
|---|---|---|---|---|
| 5,392,073 A | * | 2/1995 | Jeong | 375/240.14 |
| 5,510,856 A | * | 4/1996 | Jung | 348/699 |
| 5,539,469 A | * | 7/1996 | Jung | 375/240.14 |
| 5,812,200 A | * | 9/1998 | Normile | 375/240.12 |
| 6,052,414 A | * | 4/2000 | Lee et al. | 375/240.16 |
| 6,281,842 B1 | * | 8/2001 | Moren | 343/700 MS |

FOREIGN PATENT DOCUMENTS

| | | |
|---|---|---|
| JP | 4-288789 | 10/1992 |
| JP | 6-62392 | 3/1994 |
| JP | 8-55222 | 2/1996 |
| JP | 8-102951 | 4/1996 |
| JP | 2869142 | 12/1998 |
| JP | 11-243551 | 9/1999 |

OTHER PUBLICATIONS

Copy of Japanese Office Action dated May 27, 2003 (and English translation of relevant portion).

* cited by examiner

*Primary Examiner*—Gims Philippe
(74) *Attorney, Agent, or Firm*—Dickstein, Shapiro, Morin & Oshinsky, LLP.

(57) ABSTRACT

A motion detecting apparatus includes a comparator and motion estimator. The comparator compares a threshold and an input absolute error, and selects as a selected motion vector, one of a predetermined motion vector and an input motion vector based on the comparison result. The motion estimator determines a reference video signal based on the selected motion vector, and determines an absolute error from the determined reference video signal and an input video signal to output the determined absolute error. Then, the motion estimator estimates a motion vector from the determined reference video signal and the input video signal such that the absolute error is minimum, to output a motion vector determined based on the estimated motion vector and the selected motion vector.

19 Claims, 5 Drawing Sheets

APPARATUS AND METHOD FOR DETECTING MOTION VECTOR IN WHICH DEGRADATION OF IMAGE QUALITY CAN BE PREVENTED

BACKGROUND OF THE INVENTION

1. Field of the Invention

The present invention relates to an apparatus and method for detecting motion vector suited for use in high-efficiency coding of video data.

2. Description of the Related Art

For motion prediction in TM5 (test mode 5) of the international standard ITU-T H.262/MPEG2 for video data compression, the motion is fully examined on the basis of half of pixel. However, this system requires the handling of a large amount of data. Therefore, a motion estimating process is divided into two steps: a step of calculating a motion vector in two-pixel precision using a first stage motion estimator and a step of calculating a motion vector in half-pixel precision from the motion vectors calculated at the first stage, using a second stage motion estimator.

Figure 1:
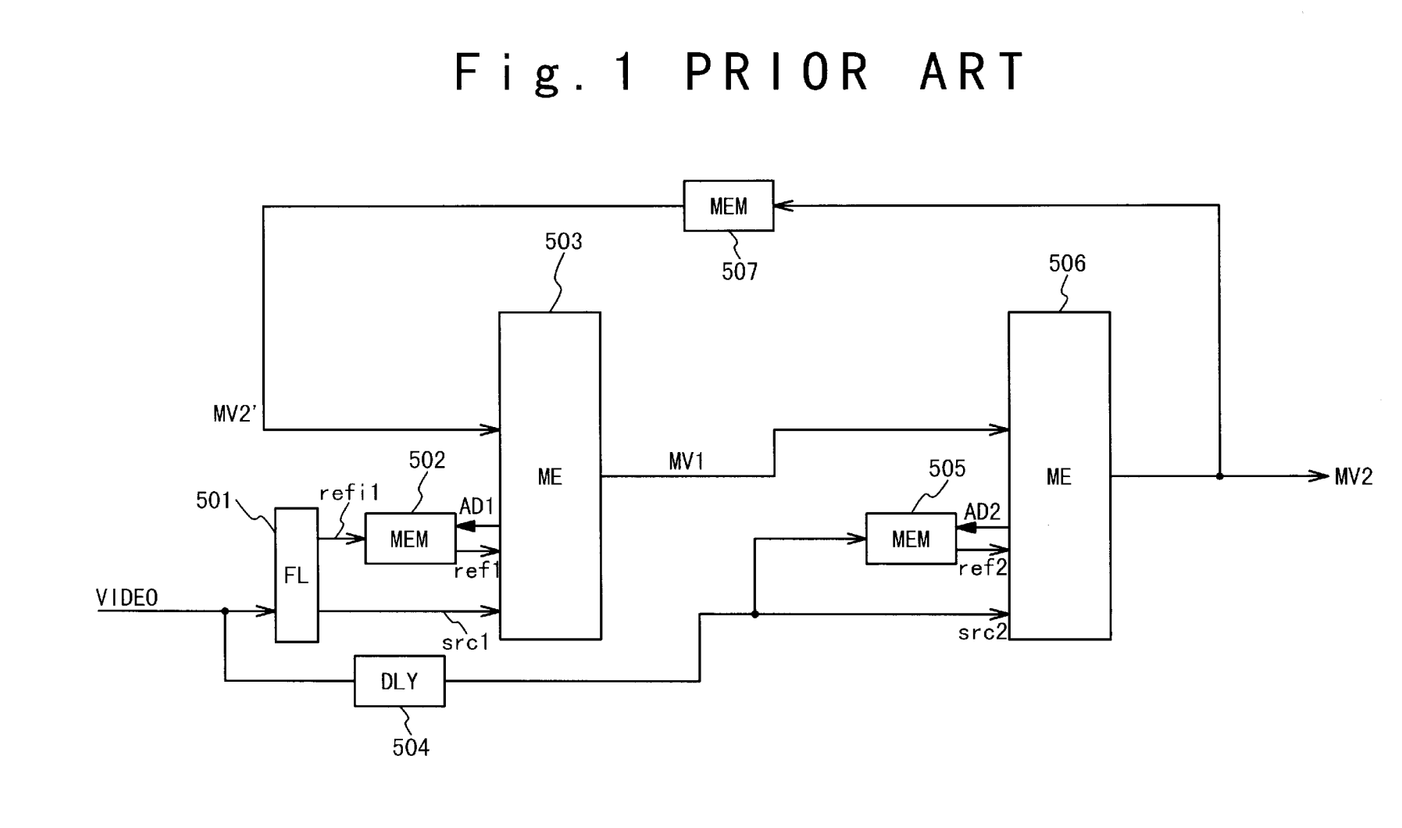
FIG. 1 is a block diagram showing the structure of a conventional motion detecting apparatus.

FIG. 1 shows the structure of a conventional motion detecting apparatus. Referring to FIG. 1, a filter (FL) 501 receives and converts a video source signal into signals refi1 and serc1 having an input format adaptive for a motion estimator (ME) 503. A memory (MEM) 502 is connected to the filter 501 and stores the reference signal refi1 for I picture data and P picture data. The motion estimator 503 is connected to the filter 501 and the memory 502 and generates and outputs an address signal AD1 shifted by a movement quantity corresponding to the motion vector MV2' to the memory 502. The motion estimator 503 calculates an absolute value of a difference between the reference signal ref1 shifted by the movement quantity corresponding to the motion vector MV2' from the start coordinates of normal retrieval and the video source signal src1 received from the filter 501, and accumulates the absolute values over 256 samples in units of macroblocks. The motion estimator 503 searches a motion vector (MV) when an absolute error (AE) is minimum, and adds the motion vector MV2' to the searched motion vector. An addition result is then outputted from the motion estimator 503 as the motion vector MV1.

An memory 505 and an motion estimator 506 are connected to a delay (DLY) unit 504 and receive a video source signal delayed by the delay unit 504. The memory 505 and the motion estimator 506 are the same in the structure as the units 502 and 503. Similarly, the motion vector MV at a minimum of the absolute error (AE) is added with the motion vector MV1 so that the addition result is outputted as a motion vector MV2.

A memory (MEM) 507 is connected to the motion estimator 506 and stores the motion vector MV2 outputted from the motion estimator 506. The stored motion vector MV2 is then outputted as the motion vector MV2'. Accordingly, the video signal will hardly be degraded in quality while the amount of data to be calculated is significantly reduced.

However, in the conventional motion detecting apparatus, there is a possibility that a value of an erroneously detected motion vector is large when a video data changing largely and randomly over the search region of the first stage motion estimator is coded. As the coding of the large motion vector value requires a large amount of data, the ratio of coded data of the motion vector to the entire coded data will increase, resulting in degradation of the quality of the image.

In conjunction with a high efficiency vide data coding system is disclosed in Japanese Laid Open Patent Application (JP-A-Heisei 6-62392). In this reference, the high efficiency vide data coding system is composed of a 2-dimensional space filter (10), a subtracter (1) and a conversion section. The 2-dimensional space filter (10) controls the spatial resolution of an input video signal (a) in accordance with to the movement quantity (n) to output a video signal (b). The subtracter (1) outputs an interframe difference signal (c) of the video signal (b) and a video signal (m) which is obtained through a motion compensation. Also, the conversion section is composed of a quantizing unit (3), an orthogonal transformation unit (2), a motion detector (9) and a variable memory (8). The conversion section receives the interframe difference signal (c) and outputs a quantized signal (e). The motion detector (9) receives the input video signal (a) and a signal (t) obtained by carrying out inverse quantization transformation to the quantized signal (e) to output the movement quantity (n) to the 2-dimensional filter (10). The variable memory (8) sends out the video signal (m) to the subtracter (1). Thus, the spatial filter is provided in the front of the coding state.

Also, a moving object detecting apparatus is disclosed in Japanese Laid Open Patent Application (JP-A-Heisei 8-55222). In this reference, a first frame memory (103a) stores a one frame of an input signal (1a). A first movement detecting circuit 104a detects the moving object from the input signal (1a) and an output signal (1c) of the first frame memory (103). A switch (108) selects one image from two images based on a control signal (1i) indicative of a final movement object detection result. A second frame memory stores (1f) stores a signal outputted the switch (108). A second movement detecting circuit (104b) detects the moving object from the input signals (1a) and the output signal (1d) outputted from second frame memory (103b). A logical operation circuit (105) carries out a logical operation of the output signal (1e) from the first movement detecting circuit (104a) and the output signal (1f) from the second movement detecting circuit (104b). A connection processing circuit (106) combines moving object areas to the output signal outputted from the logical operation circuit (105).

Also, an image coding apparatus is disclosed in Japanese Laid Open Patent Application (JP-A-Heisei 8-102951). In this reference, an image information evaluation circuit (50) evaluates an amount of information of a plurality of frames of input image data stored in a frame memory (40). A scene change detecting circuit (31) detects a scene change. A DCT circuit (14) carries out a DCT process of the image data. A quantizing unit (15) quantizes DCT coefficients. A compressing method selecting circuit (32) selects a method of compressing based on the evaluation value and the scene changing detection output adaptively. A quantization step controller (39) predicts a basic quantization step of the quantizing unit (15) from the evaluation value and an expected amount of data obtained through the compression of one frame of the image data by the selected compressing method.

Also, a motion compensation apparatus is disclosed in Japanese Laid Open Patent Application (JP-A-Heisei 11-243551). In this reference, a motion compensation processing section (200) outputs a motion vector between an input image and a reference image and an estimated image obtained from the reference image in accordance with the motion vector. An absolute value difference summing section (205) as a distortion quantity operation section inputs the input image and the estimated image and determines a distortion quantity between the input image and the estimated image. A vector value coding section (207) inputs and codes the motion vector and outputs a vector code quantity. An optimal vector determining section (210) inputs the motion vectors, the distortion quantities and the vector code quantities, determines evaluation functions calculated from the vector code quantities and the distortion quantities to all of the motion vectors, and outputs the motion vector with a minimum value as an optimal vector.

Also, a motion detecting method is disclosed in Japanese Patent No. 2,869,142. In this reference, a temporary vector with a high similarity to a true vector is detected through block matching from sample vectors arranged in a low density spatially in a first step. A next temporary vector nearer the true vector is detected in a second step through block matching from sample vectors arranged the around the temporary vector in a higher density than the first step. The true vector is detected by repeating the above step N times. In this case, a filter limits a spatial frequency band of input image data as the spatial density of the sample vectors is lower. A sub-sampling section decreases the number of sub-samples as the spatial density of the sample vectors is lower. Memories are provides for the steps other than the Nth step to store the input image data subjected to the sub-sampling for the block matching. Memories are provided for the steps to store said input image data for the block matching. Thus, the operation of the limitation of the frequency band by the filter, the operation of the sub-sampling by the sub-sampling sections, the read operation and the write operation of the image data are carried out in parallel for every step.

SUMMARY OF THE INVENTION

Therefore, an object of the present invention is to provide a motion detecting apparatus which can reduce the value of motion vector erroneously detected to an optimum or minimum quantity.

Another object of the present invention is to provide a motion detecting apparatus which can reduce the coded data for other information to suppress the degradation of image quality.

In order to achieve an aspect of the present invention, a motion detecting apparatus includes a comparator and motion estimator. The comparator compares a threshold and an input absolute error, and selects as a selected motion vector, one of a predetermined motion vector and an input motion vector based on the comparison result. The motion estimator determines a reference video signal based on the selected motion vector, and determines an absolute error from the determined reference video signal and an input video signal to output the determined absolute error. Then, the motion estimator estimates a motion vector from the determined reference video signal and the input video signal such that the absolute error is minimum, to output a motion vector determined based on the estimated motion vector and the selected motion vector.

The comparator may select the input motion vector as the selected motion vector, when the input absolute error is not greater than the threshold.

Also, the comparator may include a comparing unit which compares the threshold and the input absolute error, and a selector which selects as the selected motion vector, one of the predetermined motion vector and the input motion vector based on the comparison result.

Also, the motion detecting apparatus may further include a delay unit which delays a video signal to produce the input vide signal.

Also, when a motion detecting unit includes the comparator and the motion estimator, the motion detecting apparatus may include n (n is a natural number more than 1) of the motion detecting units connected in series. In this case, each of the n motion detecting units receives the determined absolute error and the determined motion vector from a previous stage as the input absolute error and the input motion vector, and a first stage of the n motion detecting units receives the determined absolute error and the determined motion vector from a last stage as the input absolute error and the input motion vector.

In another aspect of the present invention, a method of detecting a motion vector, is attained by (a) comparing a threshold and an input absolute error; by (b) selecting as a selected motion vector, one of a predetermined motion vector and an input motion vector based on the comparison result; by (c) determining a reference video signal based on the selected motion vector; by (d) determining an absolute error from the determined reference video signal and an input video signal to output the determined absolute error; and by (e) estimating a motion vector from the determined reference video signal and the input video signal such that the absolute error is minimum, to output a motion vector determined based on the estimated motion vector and the selected motion vector.

Also, the (b) selection may includes: selecting the input motion vector as the selected motion vector, when the input absolute error is not greater than the threshold.

Also, the method may further include delaying a video signal to produce the input vide signal.

Also, when the method includes a sequence of process groups, each of the process groups includes the (a) to (e) steps.

In order to achieve still another aspect of the present invention, a motion detecting apparatus includes a comparator and a motion estimator. The comparator selects as a selected motion vector, one of a predetermined motion vector and an input motion vector using first and second thresholds, an input absolute error and the input motion vector. The motion estimator determines a reference video signal based on the selected motion vector, and determines an absolute error from the determined reference video signal and an input video signal to output the determined absolute error. Then, the motion estimator estimates a motion vector from the determined reference video signal and the input video signal such that the absolute error is minimum, to output a motion vector determined based on the estimated motion vector and the selected motion vector.

Here, the comparator may select the input motion vector as the selected motion vector, when the input absolute error is not greater than the first threshold, and when the input motion vector is not greater than the second threshold.

Also, the comparator may include a first comparing unit which compares the first threshold and the input absolute error, a second comparing unit which compares the second threshold and the input motion vector, a logic circuit which carries logic calculation of the comparing result of the first comparing unit and the comparing result of the second comparing unit, and a selector which selects as the selected motion vector, one of the predetermined motion vector and the input motion vector based on the logic calculation result.

Also, the motion detecting apparatus may further include a delay unit which delays a video signal to produce the input vide signal.

Also, when a motion detecting unit includes the comparator and the motion estimator, the motion detecting apparatus may include n (n is a natural number more than 1) of the motion detecting units connected in series. In this case, each of the n motion detecting units receives the determined absolute error and the determined motion vector from a previous stage as the input absolute error and the input motion vector, and a first stage of the n motion detecting units receives the determined absolute error and the determined motion vector from a last stage as the input absolute error and the input motion vector.

In yet still another aspect of the present invention, a method of detecting a motion vector is attained by (a) selecting as a selected motion vector, one of a predetermined motion vector and an input motion vector using first and second thresholds, an input absolute error and the input motion vector; by (b) determining a reference video signal based on the selected motion vector; by (c) determining an absolute error from the determined reference video signal and an input video signal to output the determined absolute error; and by (c) estimating a motion vector from the determined reference video signal and the input video signal such that the absolute error is minimum, to output a motion vector determined based on the estimated motion vector and the selected motion vector.

Also, the (a) selection may be attained by selecting the input motion vector as the selected motion vector, when the input absolute error is not greater than the first threshold, and when the input motion vector is not greater than the second threshold.

Also, the (a) selection may be attained by carrying out a first comparison of the first threshold and the input absolute error; by carrying out a second comparison of the second threshold and the input motion vector; by carrying logic calculation of the first comparison result and the second comparison result; and by selecting as the selected motion vector, one of the predetermined motion vector and the input motion vector based on the logic calculation result.

Also, the method may further include delaying a video signal to produce the input vide signal.

Also, when the method comprises a sequence of process groups, each of the process groups includes said (a) to (d) steps.

DESCRIPTION OF THE PREFERRED EMBODIMENTS

Hereinafter, a motion detecting apparatus of the present invention will be described below with reference to the attached drawings. While the present invention is applicable to any motion detecting apparatus having n stages (n is an integer larger than 1), the description is based on a 2-stage motion detecting apparatus.

Figure 2:
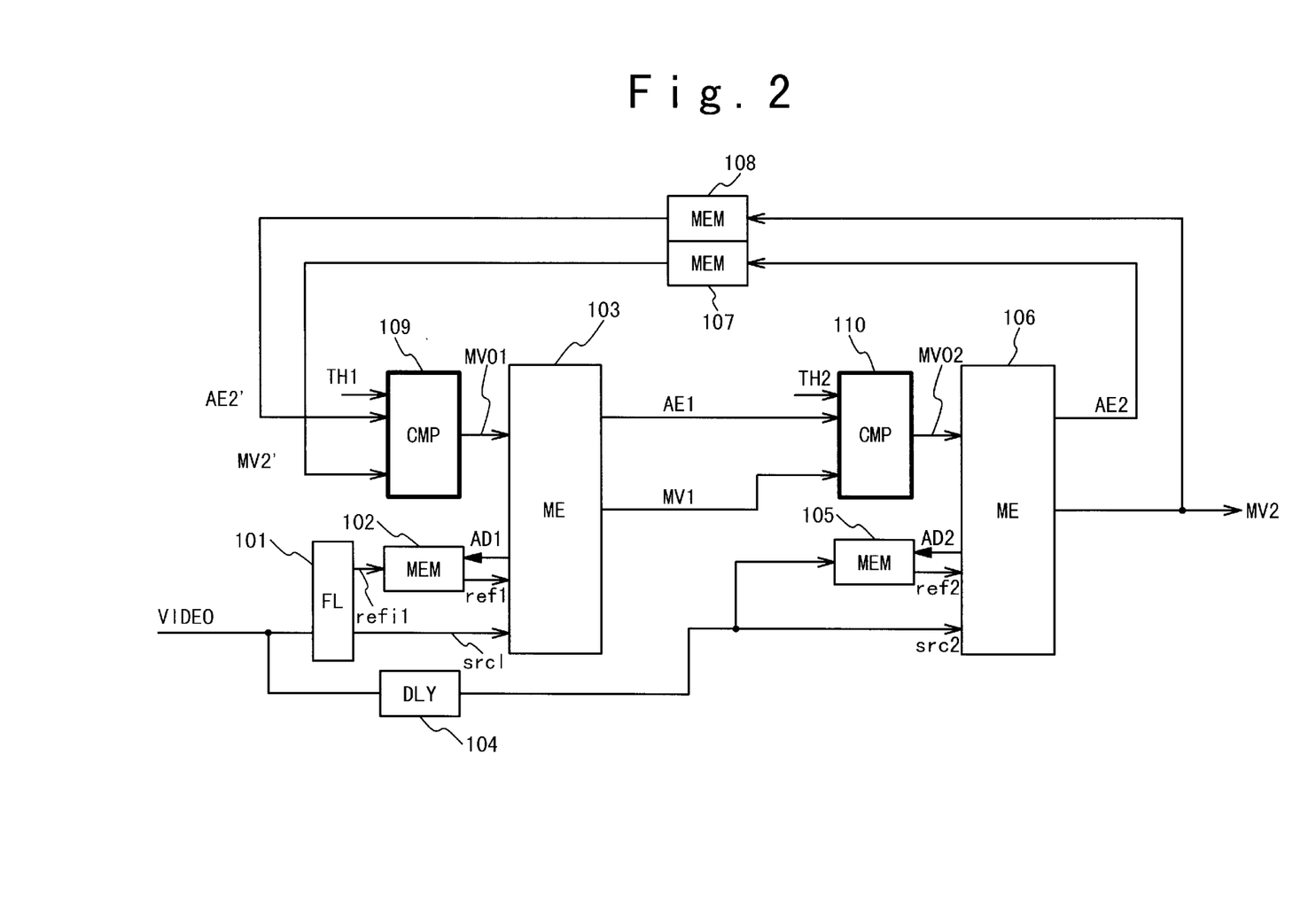
FIG. 2 is a block diagram showing the structure of a motion detecting apparatus according to a first embodiment of the present invention.

FIG. 2 shows the overall structure of the motion detecting apparatus according to the first embodiment of the present invention. As shown in FIG. 2, the motion detecting apparatus of the first embodiment is composed of an filter (FL) 101, memories (MEM) 102, 105, 107, and 108, motion estimators (ME) 103 and 106, a delay unit (DLY) 104, and comparators (CMP) 109 and 110. It is supposed that the motion estimators 103 and 106 carry out a motion estimating process over 256 samples in units of macroblocks.

The filter 101 is fed with a video source signal at each sample. The filter 101 converts the video source signal into signals ref1 and src1 having an input format adaptive for the motion estimator 103. The signals ref1 and src1 are outputted to the memory 102 and the motion estimator 103, respectively. The memory 102 stores the reference signal ref1 for I picture data and P picture data. The comparator 109 is connected to the memory 107 and 108. The comparator 109 compares a threshold TH1 and an absolute error AE2' supplied from the memory 108 to transfer either a substitution motion vector MVTH1 stored in the comparator 109 or a motion vector MV2' supplied from the memory 107 to the motion estimator 103 as a motion vector MVO1.

The motion estimator 103 is connected to the filter 101, the memory 102, and the comparator 109. The motion estimator 103 generates and outputs an address signal AD1 shifted by a movement quantity corresponding to the motion vector MVO1 to the memory 102. The motion estimator 103 also calculates an absolute value of a difference between the reference signal ref1 shifted by the movement quantity corresponding to the motion vector MVO1 from the start coordinates for normal search and the source signal src1 supplied from the filter 101 for each of 256 samples to sum the absolute values over 256 samples in units of macroblocks. The motion estimator 103 also searches the value of motion vector when the absolute error AE as a summation of the absolute values is minimum and outputs the minimum absolute error AE as an absolute error AE1. The motion estimator 103 also adds the motion vector MVO1 to the searched motion vector MV to output as a motion vector MV1.

The memory 105, the motion estimator 106, and the comparator 110 are the same in structure to the units 102, 103 and 109, respectively, and operate in a similar manner to them. That is, the memory 105 stores a reference signal src2 for I picture data and P picture data. The comparator 110 is connected to the motion estimator 103. The comparator 110 compares a threshold TH2 and the absolute error AE1 supplied from the motion estimator 103 to transfer either a substitution motion vector MVTH2 stored in the comparator 110 or the motion vector MV1 supplied from the motion estimator 103 to the motion estimator 106 as a motion vector MV02.

The motion estimator 106 is connected to the delay unit 104, the memory 105, and the comparator 110. The memory 105 and the motion estimator 106 receive a video source signal src2 delayed by the delay unit 104. The motion estimator 106 generates and outputs an address signal AD2 shifted by a movement quantity corresponding to the motion vector MV02 to the memory 105. The motion estimator 106 also calculates an absolute value of a difference between the reference signal ref2 shifted by the movement quantity corresponding to the motion vector MV02 from the start coordinates for normal search and the delayed video source signal src2 supplied from the delay unit 104 for each of 256 (=16×16) samples to sum the absolute values over 256 samples in units of macroblocks. The motion estimator 103 also searches the value of motion vector when the absolute error AE is minimum and outputs the minimum absolute error AE as an absolute error AE2. The motion estimator 106 also adds the motion vector MV02 to the searched motion vector MV to output as a motion vector MV2. Thus, the operation of the motion estimator 106 is timed with that of the motion estimator 103 by the operation of the delay unit 104.

The memory 107 is connected to the motion estimator 106 and stores the motion vector MV2 supplied from the motion estimator 106. The memory 107 outputs the stored motion vector MV2 to the comparator 109 as the motion vector MV2'. Similarly, the memory 108 is connected to the motion estimator 106 and stores the absolute error AE2 supplied from the motion estimator 106. Then, the memory 108 outputs the stored absolute error AE2 to the comparator 109 as the signal AE2'.

Figure 3:
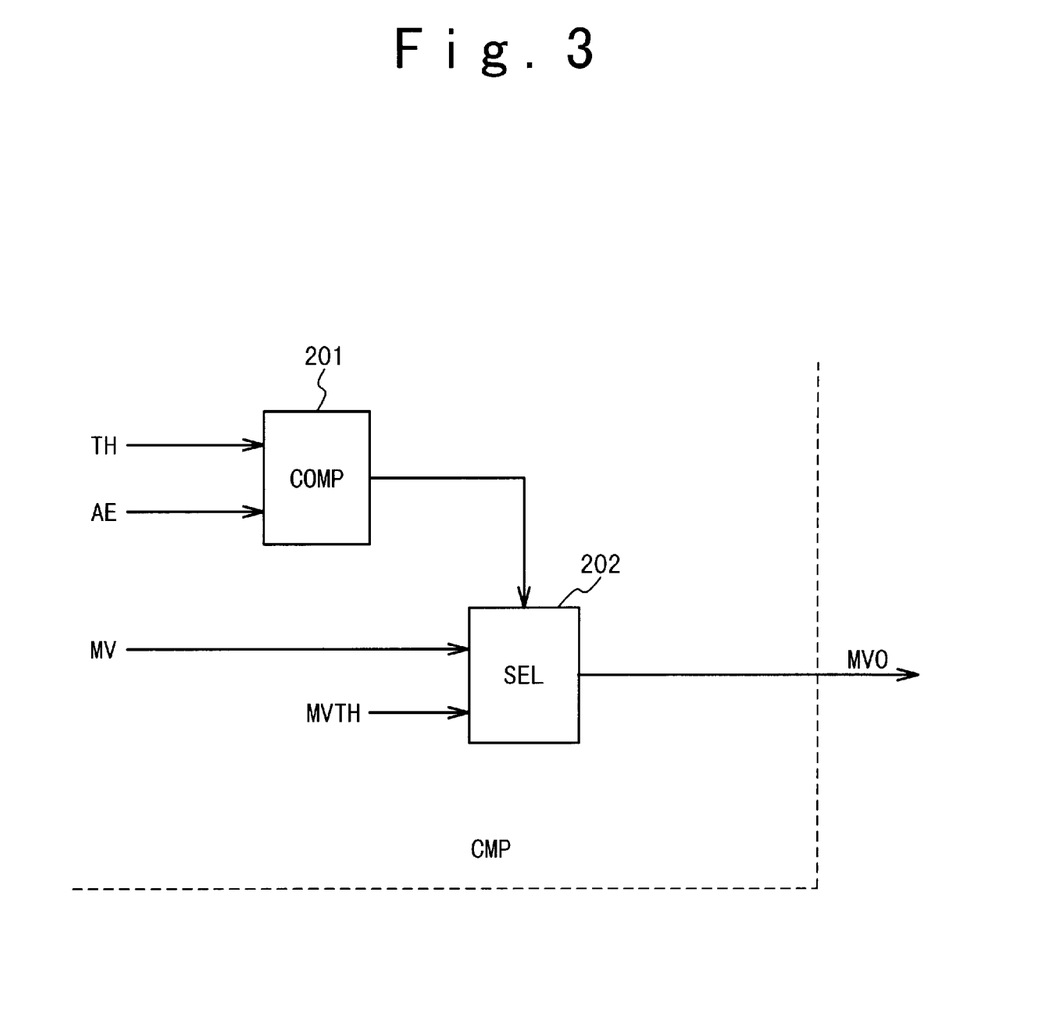
FIG. 3 is a block diagram showing the structure of a comparator.
Figure 4A:
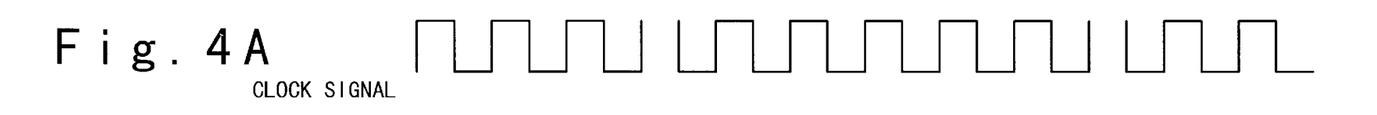
FIGS. 4A to 4G are timing charts showing an exemplary operation of the motion detecting apparatus in the first embodiment.
Figure 4B:
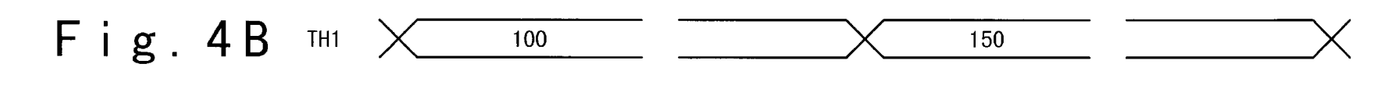
Figure 4C:
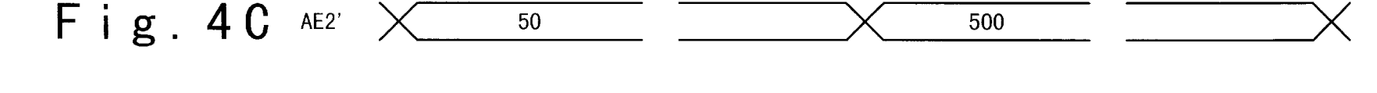
Figure 4D:
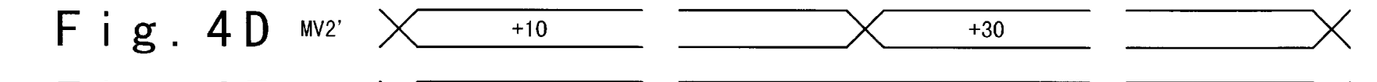
Figure 4E:
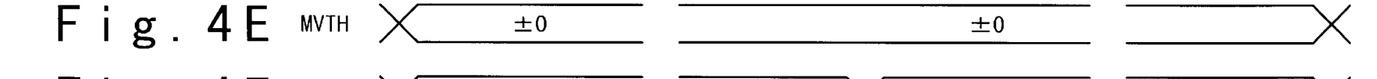
Figure 4F:
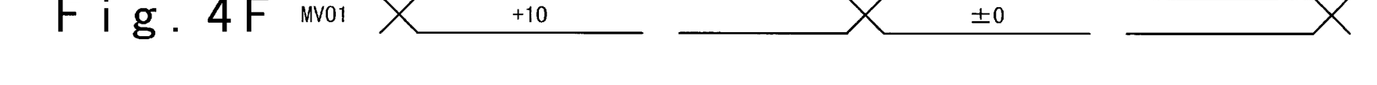
Figure 4G:
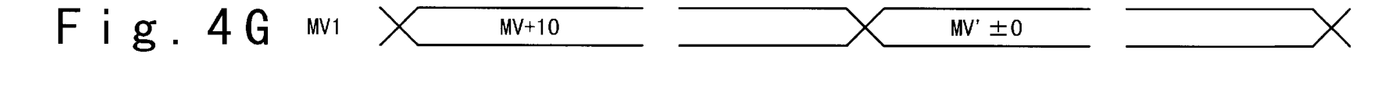

FIG. 3 shows the structure of each of the comparators 109 and 110. As shown in FIG. 3, each of the comparators 109 and 110 is composed of a comparator 201 and a selector 202. The comparator 201 receives and compares a threshold signal TH and an absolute error signal AE. When the signal AE is greater than the threshold signal TH, the comparator 201 generates a selection signal to allow the selector 202 to output the substitution motion vector MVTH corresponding to a predetermined threshold TH as the signal MV0.

The selector 202 is connected to the comparator 201, and selects and outputs either the motion vector MV or the substitution motion vector MVTH as the signal MV0 in response to the selection signal. More particularly, when the absolute error AE2' is greater than the signal TH1 in the comparator 109, the substitution motion vector MVTH1 corresponding to a predetermined threshold signal TH1 is outputted as the signal MVO1. When the absolute error AE2' is not greater than the threshold signal TH1, the signal MV2 is outputted as a signal MVO1. Also, when the absolute error AE1 is greater than the signal TH2 in the comparator 110, the substitution motion vector MVTH2 corresponding to the predetermined threshold signal TH2 is outputted as the signal MV02. When the absolute error AE1 is not greater than the threshold signal TH2, the signal MV2 is outputted as the signal MV02.

The operation of the motion vector detecting apparatus in the first embodiment will be described in more detail. FIGS. 4A to 4G are timing charts showing an exemplary operation of the motion detecting apparatus in the first embodiment. As shown in FIGS. 4A to 4D, the threshold TH1, the absolute error AE2', and the motion vector MV2' are first supplied to the comparator 109. At the time of reception, it is supposed that the threshold value TH1 is a fixed value. As shown in the first half of the timing charts shown in FIGS. 4A to 4D, the absolute error AE2' is smaller than the threshold TH1 and the comparator 109 outputs the motion vector MV2' as the signal MVO1. The motion estimator 103 reads out the reference signal ref1 at the position shifted by the movement quantity corresponding to the signal MVO1 from the memory 102 and uses the reference signal ref1 to detect the motion vector between the source signal src1 and the reference signal ref1. The motion vector MV detected by using the signal MVO1 as the origin is added with the signal MVO1 to output an (MV+MVO1) signal. As (MVO1=MV2'=+10) in an example shown in FIGS. 4A to 4G, the motion estimator 103 outputs an (MV+10) signal.

Meanwhile, the absolute error AE2' is greater than the threshold TH1 in the second half of the timing charts of FIGS. 4A to 4G. Therefore, the comparator 109 outputs the substitution motion vector MVTH1 as the signal MVO1. The motion estimator 103 reads out the reference signal ref1 at the position shifted by the movement quantity corresponding to the signal MVO1 from the memory 102 and uses the reference signal ref1 to detect the motion vector MV' between the source signal src1 and the reference signal ref1. The motion vector MV' detected based on the signal MVO1 as the origin is added with the motion vector MVO1 to output a (MV'+MVO1) signal. As (MVO1=MVTH1=±0) in the example shown in FIGS. 4A to 4G, the motion estimator 103 outputs an (MV'±0) signal.

According to the first embodiment, when the absolute value AE2' is not greater than the threshold TH1, the signal MV2' is directly used by the motion estimator 103 as the shift quantity of the access point for the reference signal. When the absolute error AE2' is greater than the threshold TH1, the substitution motion vector MVTH1 not the signal MV2' is used by the motion estimator 103 as the shift quantity of the access point for the reference signal. In other words, when the absolute error AE is greater than a predetermined threshold, the vector corresponding to the threshold is applied as an offset value to the motion estimator. Accordingly, the motion vector erroneously detected can be optimized or minimized.

It should be noted that the thresholds TH1 and TH2 are applied to the comparators 109 and 110 as correction parameters for meeting the standards and conditions of various image data including 1080I format and 480I format. The thresholds TH1 and TH2 may be determined in accordance with the result of image quality estimation.

Figure 5:
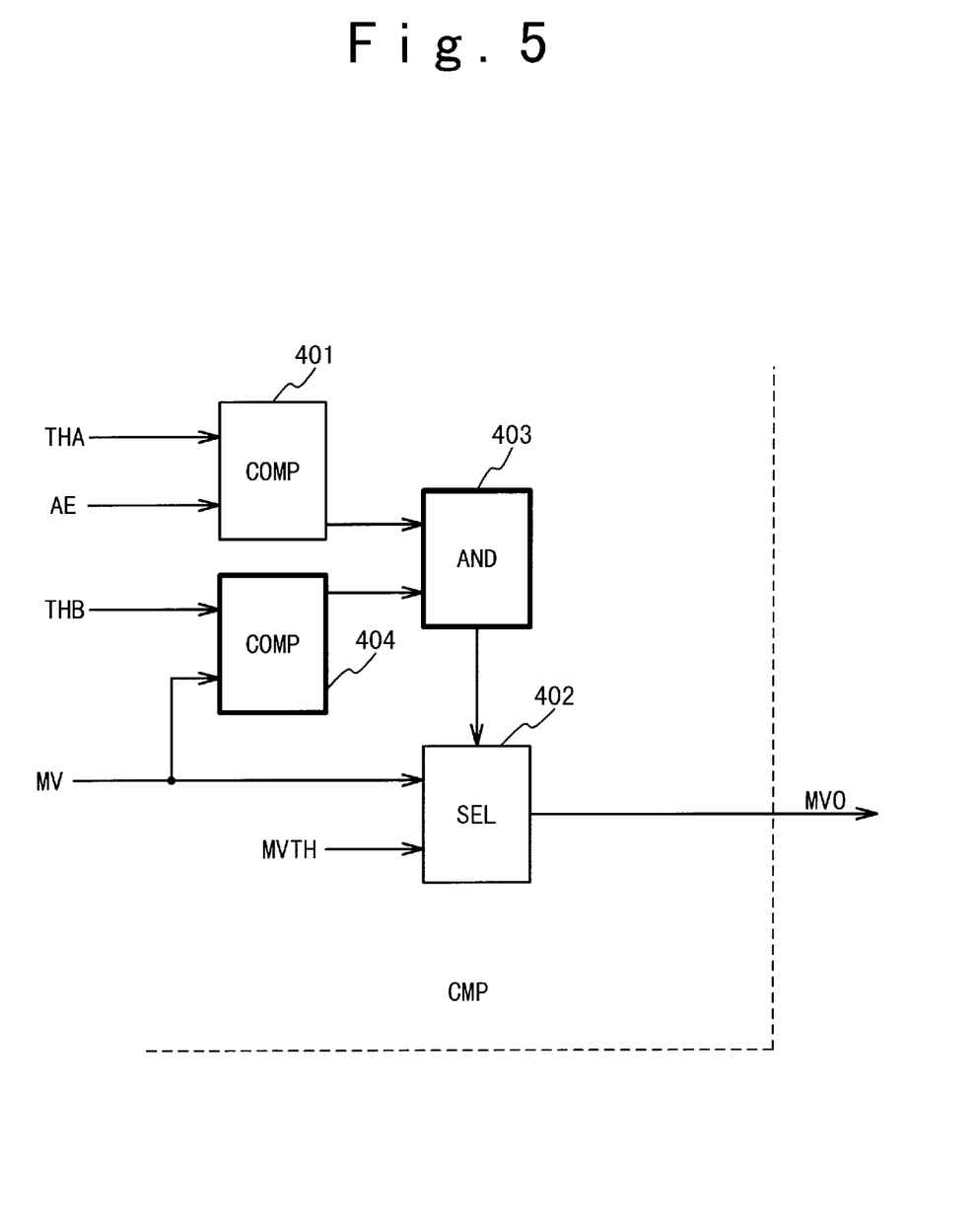
FIG. 5 is a block diagram showing the structure of a comparator in the second embodiment of the present invention.

Next, the motion vector detecting apparatus according to the second embodiment of the present invention will now be described below. FIG. 5 shows the structure of each of the comparators 109 and 110 of the second embodiment. The other components in the second embodiment are identical to those of the first embodiment other than the comparators 109 and 110 and will be described in no more detail. The comparators 109 and 110 of the second embodiment only will be described.

As shown in FIG. 5, each of the comparators 109 and 110 is composed of a comparator 401, a selector 402, an AND circuit 402, and a comparator 404. The comparator 401 receives and compares a given threshold THA and the absolute error AE. When the absolute error AE is greater than the threshold THA, a control signal for selecting the substitution motion vector MVTH corresponding to the threshold THA is outputted to the AND circuit 403.

The comparator 404 is fed with a threshold THB and the motion vector MV. The comparator 404 supplies the AND circuit 403 with a control signal for selecting the substitution motion vector MVTH, when the motion vector MV is greater than the threshold THB. When both of the control signal from the comparator 402 and the control signal from the comparator 404 indicate the output of the substitution motion vector MVTH, the AND circuit 403 outputs a selection signal to the selector 402 for selecting and outputting the substitution motion vector MVTH. Accordingly, only when the absolute error AE is greater than the threshold THA and the motion vector MV is greater than the threshold THB, the substitution motion vector MVTH is outputted. Thus, erroneous detection of the motion vector can successfully be avoided. Also, it is possible to prepare a more number of comparators and logic circuits for comparison with their respective threshold values and subjecting their outputs to the logic operations so that the selector 402 can favorably be controlled by resultant logic signals.

The 2-stage motion vector detecting apparatus is described in the first and second embodiments of the present invention. However, the present invention may equally be applicable to an n-stage (n being a natural number) motion detecting apparatus. In this case, n motion estimators and n comparators are provided. In operation, the motion vector MV determined by the first-stage motion estimator and the minimum of an absolute error (AE1) are transferred to the succeeding-stage comparator where the signal AE1 is compared with a threshold TH2. According to a result of the comparison, a control signal (MVO2) is given to the succeeding-stage motion estimator. By repeating those steps, the motion vector (MVn) determined by the final-stage motion estimator and the minimum of an absolute error (AEn) are transferred via a corresponding memory to the first-stage CMP where the minimum of an absolute error (AEn') at the final stage received from the corresponding memory is compared with a threshold TH1. According to a result of the comparison, a control signal MVO1 is given to the first-stage motion estimator for determining the motion vector through the n stages. The components are not limited in the number, the location, the shape, and other characteristics to those described with the embodiments but may arbitrarily be determined depending on their application.

As set forth above, according to the present invention, when the signal AE is great enough (possibly indicative of erroneous detection of the signal MV), the predetermined substitution motion vector MVTH can be given to the corresponding motion estimator. If the absolute error AE is not great, the motion vector can be calculated and used by a conventional manner. This will decrease the amount of motion vector MV data relative to the entire amount of coded data.

Also, the mode of operation is determined based on the video source data and a threshold. This allows the motion vector to be determined automatically.

Also, the threshold is preset from the outside. Accordingly, the apparatus is compatible with any other video formats including MPEG1, MPEG2, MPEG4, 1080I, 720P, and 480I.

In addition, the comparator is implemented by a simple combination of a comparator and a selector. The optimum mode of operation can be selected by modifying the input/output conditions of each comparator.

Furthermore, since the input conditions are a motion vector MV, the signal AE corresponding to MV, and a threshold, the n-stage (n being a natural number) motion estimator operation can successfully be performed with the use of n motion estimators connected at input to corresponding comparators.

What is claimed is:

1. A motion detecting apparatus comprising:
    a comparator which compares a threshold and an input absolute error, and selects as a selected motion vector, one of a predetermined motion vector and an input motion vector based on the comparison result; and
    a motion estimator which determines a reference video signal based on said selected motion vector, determines an absolute error from said determined reference video signal and an input video signal to output said determined absolute error, and estimates a motion vector from said determined reference video signal and said input video signal such that said absolute error is minimum, to output a motion vector determined based on the estimated motion vector and said selected motion vector.

2. The motion detecting apparatus according to claim 1, wherein said comparator selects said input motion vector as said selected motion vector, when said input absolute error is not greater than said threshold.

3. The motion detecting apparatus according to claim 1, wherein said comparator comprises:
    a comparing unit which compares said threshold and said input absolute error; and
    a selector which selects as said selected motion vector, one of said predetermined motion vector and said input motion vector based on the comparison result.

4. The motion detecting apparatus according to claim 1, further comprising:
    a delay unit which delays a video signal to produce said input vide signal.

5. The motion detecting apparatus according to claim 1, wherein a motion detecting unit includes said comparator and said motion estimator, and
    wherein said motion detecting apparatus comprises n (n is a natural number more than 1) of said motion detecting units connected in series,
    wherein each of said n motion detecting units receives said determined absolute error and said determined motion vector from a previous stage as said input absolute error and said input motion vector,
    a first stage of said n motion detecting units receives said determined absolute error and said determined motion vector from a last stage as said input absolute error and said input motion vector.

6. A method of detecting a motion vector, comprising:
    (a) comparing a threshold and an input absolute error;
    (b) selecting as a selected motion vector, one of a predetermined motion vector and an input motion vector based on the comparison result;
    (c) determining a reference video signal based on said selected motion vector;
    (d) determining an absolute error from said determined reference video signal and an input video signal to output said determined absolute error; and
    (e) estimating a motion vector from said determined reference video signal and said input video signal such that said absolute error is minimum, to output a motion vector determined based on the estimated motion vector and said selected motion vector.

7. The method according to claim 6, wherein said (b) selecting includes:
    selecting said input motion vector as said selected motion vector, when said input absolute error is not greater than said threshold.

8. The method according to claim 6, further comprising:
    delaying a video signal to produce said input video signal.

9. The method according to claim 6, wherein said method comprises a sequence of process groups, each of which includes said (a) to (e) steps.

10. A motion detecting apparatus comprising:
    a comparator which selects as a selected motion vector, one of a predetermined motion vector and an input motion vector using first and second thresholds, an input absolute error and said input motion vector; and
    a motion estimator which determines a reference video signal based on said selected motion vector, determines an absolute error from said determined reference video signal and an input video signal to output said determined absolute error, and estimates a motion vector from said determined reference video signal and said input video signal such that said absolute error is minimum, to output a motion vector determined based on the estimated motion vector and said selected motion vector.

11. The motion detecting apparatus according to claim 10, wherein said comparator selects said input motion vector as said selected motion vector, when said input absolute error is not greater than said first threshold, and when said input motion vector is not greater than said second threshold.

12. The motion detecting apparatus according to claim 10, wherein said comparator comprises:

a first comparing unit which compares said first threshold and said input absolute error;

a second comparing unit which compares said second threshold and said input motion vector;

a logic circuit which carries logic calculation of the comparing result of said first comparing unit and the comparing result of said second comparing unit; and a selector which selects as said selected motion vector, one of said predetermined motion vector and said input motion vector based on the logic calculation result.

13. The motion detecting apparatus according to claim 10, further comprising:

a delay unit which delays a video signal to produce said input vide signal.

14. The motion detecting apparatus according to claim 10, wherein a motion detecting unit includes said comparator and said motion estimator, and wherein said motion detecting apparatus comprises n (n is a natural number more than 1) of said motion detecting units connected in series, wherein each of said n motion detecting units receives said determined absolute error and said determined motion vector from a previous stage as said input absolute error and said input motion vector, a first stage of said n motion detecting units receives said determined absolute error and said determined motion vector from a last stage as said input absolute error and said input motion vector.

15. A method of detecting a motion vector, comprising:

(a) selecting as a selected motion vector, one of a predetermined motion vector and an input motion vector using first and second thresholds, an input absolute error and said input motion vector;

(b) determining a reference video signal based on said selected motion vector;

(c) determining an absolute error from said determined reference video signal and an input video signal to output said determined absolute error; and (d) estimating a motion vector from said determined reference video signal and said input video signal such that said absolute error is minimum, to output a motion vector determined based on the estimated motion vector and said selected motion vector.

16. The method according to claim 15, wherein said (a) selecting includes:

selecting said input motion vector as said selected motion vector, when said input absolute error is not greater than said first threshold, and when said input motion vector is not greater than said second threshold.

17. The method according to claim 15, wherein said (a) selecting includes:

carrying out a first comparison of said first threshold and said input absolute error;

carrying out a second comparison of said second threshold and said input motion vector;

carrying logic calculation of the first comparison result and the second comparison result; and selecting as said selected motion vector, one of said predetermined motion vector and said input motion vector based on the logic calculation result.

18. The method according to claim 15, further comprising:

delaying a video signal to produce said input vide signal.

19. The method according to claim 15, wherein said method comprises a sequence of process groups, each of which includes said (a) to (d) steps.

* * * * *